US012736831B2

(12) United States Patent
Hamlaoui et al.

(10) Patent No.: US 12,736,831 B2
(45) Date of Patent: Sep. 15, 2026

(54) METHOD FOR DETERMINING THE ADAPTATION OF A MYOPIA CONTROL OPTICAL LENS

(71) Applicant: ESSILOR INTERNATIONAL, Charenton-le-Pont (FR)

(72) Inventors: Samy Hamlaoui, Paris (FR); Alain Goulet, Ormesson sur Marne (FR); Sébastien Fricker, Creteil (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 748 days.

(21) Appl. No.: 18/193,277

(22) Filed: Mar. 30, 2023

(65) Prior Publication Data

US 2023/0314837 A1 Oct. 5, 2023

(30) Foreign Application Priority Data

Mar. 31, 2022 (EP) .................................... 22305427

(51) Int. Cl.
*G02C 7/02* (2006.01)

(52) U.S. Cl.
CPC ............ *G02C 7/027* (2013.01); *G02C 7/028* (2013.01); *G02C 2202/24* (2013.01)

(58) Field of Classification Search
CPC .... G02C 7/027; G02C 7/028; G02C 2202/24; G09B 23/30; G09B 23/306; G09B 23/303; G09B 23/32; G09B 23/28; G09B 23/286
See application file for complete search history.

(56) References Cited

U.S. PATENT DOCUMENTS 10,268,050 B2 4/2019 To et al.
2007/0115431 A1 5/2007 Smith et al.
(Continued)

FOREIGN PATENT DOCUMENTS

WO WO2014/059465 A1 4/2014
WO WO 2015/087436 A1 6/2015
(Continued)

OTHER PUBLICATIONS

Bian et al. Proceedings vol. 10815, Optical Design and Testing VIII; 108150A (2018) (Year: 2018).*
(Continued)

*Primary Examiner* — Travis S Fissel
(74) *Attorney, Agent, or Firm* — Oblon, McClelland, Maier & Neustadt, L.L.P.

(57) ABSTRACT

A method for determining the adaptation of a myopia control optical lens to a wearer, configured to provide simultaneously to the wearer a refractive optical function based on a prescription for the wearer and a myopia control function, the method includes providing an eye model, a visual environment, a myopia control optical lens model, and a reference frame and positioning the eye model, the myopia control optical lens model and the visual environment in the reference frame. A central vision quality criterion is determined for an object of the visual environment seen by the eye model through the myopia control optical lens. A myopia control efficiency criterion is determined for an object of the visual environment seen by the eye through the myopia control optical lens. The adaptation of the myopia control optical lens is determined based on the central vision quality criterion and the myopia control efficiency criterion.

15 Claims, 7 Drawing Sheets

(56) References Cited

U.S. PATENT DOCUMENTS

| | | | |
|---|---|---|---|
| 2017/0336655 A1 | 11/2017 | Neitz et al. | |
| 2018/0210228 A1 | 7/2018 | Trumm et al. | |
| 2020/0132441 A1 | 4/2020 | Uchidani et al. | |
| 2020/0326560 A1* | 10/2020 | Becken | G02C 7/061 |
| 2021/0271112 A1 | 9/2021 | Qi et al. | |
| 2022/0057293 A1 | 2/2022 | Qi et al. | |

FOREIGN PATENT DOCUMENTS

| | | |
|---|---|---|
| WO | WO 2017/064065 A1 | 4/2017 |
| WO | WO2020/004550 A2 | 1/2020 |
| WO | WO2020/099549 A1 | 5/2020 |
| WO | WO 2020/120595 A1 | 6/2020 |
| WO | WO2020/137534 A1 | 7/2020 |
| WO | WO2020/262569 A1 | 12/2020 |

OTHER PUBLICATIONS

Bourdoncle et al., "Ray-tracing through progressive ophthalmic lenses," SPIE vol. 1354 International Lens Design Conference, 1990, pp. 194-199.

Escudero-Sanz et al., "Off-axis aberrations of a wide-angle schematic eye model," Journal of Optical Society of America, vol. 16, No. 8, Aug. 1999, pp. 1881-1891.

López-Gil et al., "Accommodation-Related Changes in Monochromatic Aberrations of the Human Eye as a Function of Age," Investigative Ophthalmology & Visual Science (IOVS), vol. 49, No. 4, Apr. 2008, pp. 1736-1743.

Navarro, "Adaptive model of the aging emmetropic eye and its changes with accommodation," Journal of Vision, vol. 14, No. 13, 2014, pp. 1-17 (with cover page).

Goodman, "Introduction to Fourier Optics," McGraw-Hill Series in Electrical and Computer Engineering, Second Edition, 1996, 457 pages.

Atchison, "Optical models for human myopic eyes," Vision Research, vol. 46, 2006, pp. 2236-2250.

Li et al., "Peripheral refraction in 7- and 14-year-old children in central China: the Anyang Childhood Eye Study," British Journal of Ophthalmology, vol. 99, Nov. 2014, pp. 674-679 (8 total pages).

Extended European Search Report issued Oct. 4, 2022, in corresponding European Patent Application No. 22305427.1, 47 pages.

Bian Yayan et al., "Design of Multizone Soft Contact Lens to Slow Myopia Progression", Proceedings of SPIE; [Proceedings of SPIE; ISSN 0277-786x; vol. 8615], SPIE, XP060112554, vol. 10815, Nov. 5, 2018, pp. 108150A-108150A, DOI: 10.1117/12.2323466, ISBN: 978-1-5106-2099-5.

* cited by examiner

METHOD FOR DETERMINING THE ADAPTATION OF A MYOPIA CONTROL OPTICAL LENS

TECHNICAL FIELD

The disclosure relates to a method, for example implemented by computer means, for determining the adaptation of a myopia control optical lens to a wearer and to a method for selecting the most adapted myopia control optical lens.

BACKGROUND

Myopia of an eye is characterized by the fact that the eye focuses distant objects in front of its retina. Myopia is usually corrected using a concave lens. Myopia, also referred as to short-sightedness, has become a major public health problem worldwide. Accordingly, a large effort has been made to develop solutions aiming to slow down myopia progression.

Most of the recent management strategies for myopia and/or hyperopia progression involves acting on the peripheral vision using optical defocus. Several methods and products are used to slow down myopia progression by inducing such peripheral optical defocus. Among these solutions, orthokeratology contact lenses, soft bifocal or progressive contact lenses, single vision lenses with adjusted peripheral power, circular progressive ophthalmic lenses, prismed bifocal lenses, lenses with diffuse elements, and lenses with array of microlenses have been shown to be more or less effective, through randomized controlled trials.

Myopia control solutions comprising an array of microlenses have been proposed, in particular by the applicant. The purpose of this array of microlenses is to provide an optical blurred image, other than on the retina, for example in front of the retina, triggering a stop signal that limits the eyes growth, while enabling a good vision.

With the development of a multitude of myopia control solutions, the optical lens designs are becoming more complex. With this new optical lens designs, the visual acuity of the wearer may be affected by the elements providing the function reducing the progression of the abnormal refraction.

Therefore, there is a need to provide a method that can adapt any of these myopia control lenses to provide the best balance of visual acuity and reduction of the progression of the abnormal refraction to the wearer.

SUMMARY

To this end, the disclosure proposes a method, for example implemented by computer means, for determining the adaptation of a myopia control optical lens to a wearer, the myopia control optical lens being configured to provide simultaneously to the wearer a refractive optical function based on a prescription for said wearer and a myopia control function to reduce, delay or prevent myopia progression of the wearer, the method comprises:

- providing an eye model corresponding to an eye of the wearer, said eye model comprising at least geometrical data relative to at least one structure of the eye model, a center of rotation of the eye model (ERC) and at least one optical axis passing through the eye model rotation center,
- providing a visual environment comprising at least a source object point (M) and at least one object point (S),
- providing a myopia control optical lens model,
- providing a reference frame and positioning the eye model, the myopia control optical lens model and the visual environment in the reference frame,
- determining at least one central vision quality criteria for the at least one object point (M) of the visual environment seen by the eye model through the myopia control optical lens model,
- determining at least one myopia control efficiency criteria for the at least one object point (S) of the visual environment seen by the eye through the myopia control optical lens model, and
- determining the adaptation of the myopia control optical lens to the wearer based on the at least one central vision quality criteria and the at least one myopia control efficiency criteria.

Advantageously, determining the adaptation of the myopia control lens allows adapting the optical lens to the wearer so that it provides the best reduction of the progression of myopia while maintaining the best visual acuity for central vision. In other words, the adaptation of the myopia control optical lens allows best balancing the visual acuity and myopia control function for a specific wearer.

According to further embodiments which can be considered alone or in combination:

- the at least one structure of the eye model relates to an eye's cornea, and/or an eye's crystalline lens, and/or an eye's pupil, and/or an eye's retina surface; and/or
- the eye model is selected based on data relative to the wearer, for example based on the wearer age and/or the wearer eye prescription; and/or
- the visual environment corresponds to a set of object points in space; and/or
- the visual environment is associated with a visual ergorama; and/or
- the visual environment is associated with a discrete set of points located within a visual field of the eye model greater than or equal to 20° and at different distances from the eye model rotation center (ERC); and/or
- the central vision quality criteria is based on at least one of: Strehl ratio, and/or a Modulation Transfer Function (MTF), and/or power error, and/or astigmatism error, and/or fraction of encircled energy radius, and/or, spot diagram radius, and/or a point spread function (PSF), and/or an optical transfer function (OTF), and/or visual Strehl ratio (VSX, VSOTF, VSMTF), and/or wavefront aberrations; and/or
  - determining the central vision quality criteria further comprises:
- determining at least one central gaze direction ($\alpha M$; $\beta M$) associated with the source object point (M),
- rotating the eye model around the eye model rotation center (ERC) so that the eye model optical axis coincides with the central gaze direction ($\alpha M$; $\beta M$),
- modifying at least one parameter of the eye model,
- calculating a central vision quality criteria based on the relative position of the source object point (M) to the eye model rotation center (ERC) within the reference frame, the myopia control optical lens model, and the modified eye model,
- optimizing the central vision quality criteria by repeating the steps of modifying at least one parameter of the eye model and of calculating a central vision quality criteria; and/or determining the myopia control efficiency criteria further comprises:

determining, for a central gaze direction (αM; βM) of the eye model associated with the source point object (M), at least one peripheral light ray P associated with the at least one object source point (S) and passing through the myopia control optical lens model and the eye model's pupil at a direction (αS; βS), evaluating, for the at least one object source point (S) associated to the at least one peripheral light ray P, the location of the astigmatic foci from light passing through the myopia control optical lens model and the eye model, evaluating a peripheral defocus based on the evaluated distances between the astigmatic foci locations of the at least one peripheral light ray P and the intersection of the peripheral light ray P and the eye model's retina; and/or determining the myopia control efficiency criteria comprises:

determining, for a central gaze direction (αM; βM) of the eye model associated with the source point object (M), at least one peripheral light ray P associated with the at least one object source point (S) and passing through the myopia control optical lens model and the eye model's pupil at a direction (αS; βS), adding a thin sphero-torical lens model in front of the myopia control optical lens model such that an optical axis of said thin sphero-torical lens model coincides with the at least one peripheral light ray P when the peripheral light ray propagates in the visual environment, optimizing a surface of the thin sphero-torical lens model so that light from the object source point (S) associated to the at least one peripheral light ray P focuses on the eye model's retina, determining the mean optical power of the optimized thin sphero-torical lens model, evaluating a peripheral defocus based on the mean optical power of the thin sphero-torical lens model; and/or determining the myopia control efficiency criteria comprises:

determining, for a central gaze direction (αM; βM) of the eye model associated with the source point object (M), at least one peripheral light ray P associated with the at least one object point source (S) and passing through the myopia control optical lens model and the eye model's pupil at a direction (αS; βS), determining a metric Q assessing an image quality of the object point (S) through the myopia control optical lens model and the eye model on the eye model's retina; and/or determining the myopia control criteria further comprises:

modifying at least one eye model parameter, repeating the steps of determining the metric Q and of modifying the at least one eye model parameter, determining the at least one eye model parameter for which the metric Q is optimal; and/or determining the myopia control criteria further comprises:

evaluating the metric Q as a function of at least one eye model parameter, determining the slope of the metric Q expressed as a function of the at least one eye model parameter; and/or the metric Q assessing the image quality for peripheral vision is based on at least one of: Strehl ratio, and/or a Modulation Transfer Function, and/or power error, and/or astigmatism error, and/or fraction of encircled energy radius, and/or spot diagram radius, and/or a Point Spread Function (VSX), and/or an Optical transfer Function (VSOTF), and/or visual Strehl ratio (VSX, VSOTF, VSMTF), and/or wavefront aberrations; and/or the at least one myopia control efficiency criteria is evaluated for a set of object source points ($S_k$) located in the visual environment and according to a set of central gaze directions ($\alpha M_i$; $\beta M_i$).

The disclosure further relates a method for comparing at least two myopia control optical lenses for a wearer and selecting the most adapted, the method comprising:

determining the adaptation of each myopia control optical lens for the wearer by a method according to the disclosure, and comparing the adaptation of each myopia control optical lens to the wearer and selecting the most adapted myopia control optical lens.

BRIEF DESCRIPTION OF THE DRAWINGS

Embodiments of the invention will now be described, by way of example only, and with reference to the following drawings in which.

Figure 1:
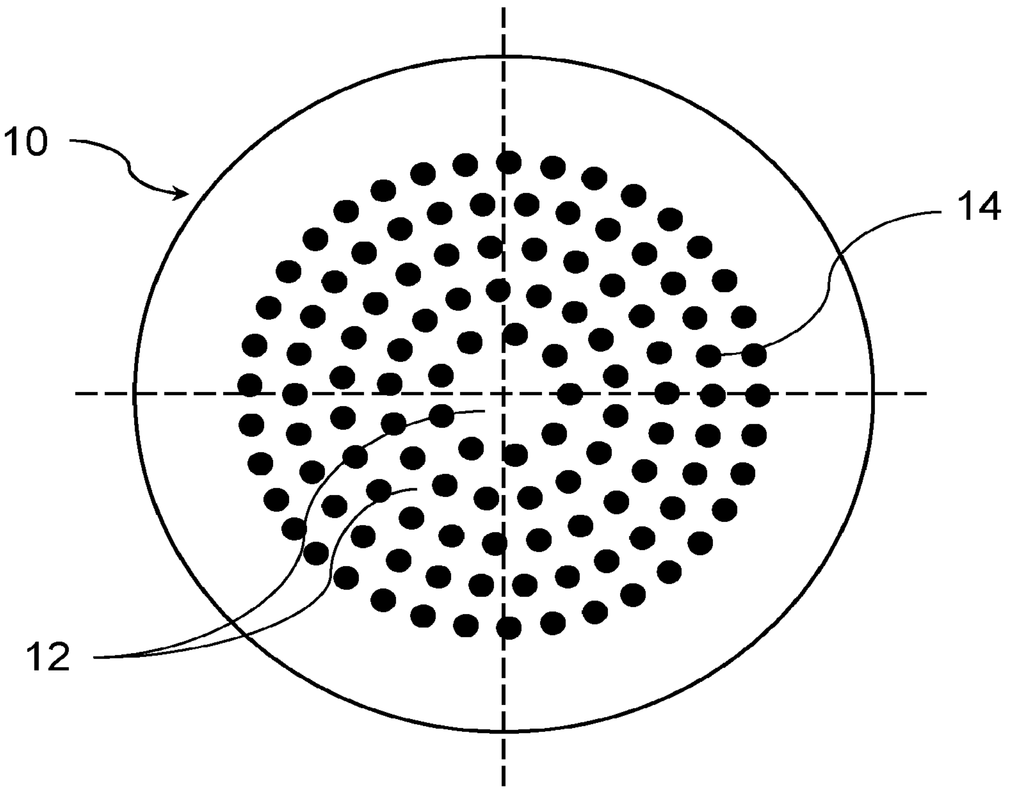
FIG. 1 illustrates a schematic front view of a lens element according to an embodiment of the disclosure.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION

In the remainder of the description, terms like «up», «bottom», «horizontal», «vertical», «above», «below», «front», «rear» or other words indicating relative position may be used. These terms are to be understood in the wearing conditions of the optical lens.

The disclosure relates to a method for determining the adaptation of a myopia control optical lens to a wearer. The method may for example be implemented by computer means.

In the context of the present invention, the term "optical lens" can refer to a contact lens or an optical lens or a spectacle optical lens edged to fit a specific spectacle frame or an ophthalmic lens, or an optical device adapted to be positioned on the ophthalmic lens. The optical device may be positioned on the front or back surface of the ophthalmic lens. The optical device may be an optical patch or film. The optical device may be adapted to be removably positioned on the ophthalmic lens for example a clip configured to be clipped on a spectacle frame comprising the ophthalmic lens.

The myopia control optical lens is configured to provide simultaneously to the wearer, a refractive optical function based on a prescription for said wearer and a myopia control function to reduce, delay or prevent myopia progression of the wearer.

The term “prescription” is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for distance vision. The prescription may comprise an indication that the eye of the wearer has no defect and that no refractive power is to be provided to the wearer.

The term “myopia control function” is to be understood as an optical function that reduces progression of the wearer’s myopia. In other words, when the wearer wears the myopia control optical lens, for example in standard wearing conditions, light passing through the myopia control optical lens will create a control signal that suppresses, slows-down or at least reduces the elongation of the eye of the wearer. In particular, the myopia control function provides a perturbated image on the retina of the wearer. For example, the perturbated image may be an image of reduced quality compared to a single vision lens adapted to the refractive defect of the wearer. For example, the perturbated image may be generated by an optical function of not focusing an image on the retina of the eye of the wearer. In other words, when the wearer wears the myopia control optical lens, for example in standard wearing conditions, part of rays of light passing through the myopia control optical lens will not focus on the retina of the eye of the wearer and will generate a volume of focused or unfocused light in front and/or behind the retina of the eye of the wearer.

The myopia control function may be an optical function, for example a spherical function, focusing rays of light elsewhere than on the retina of the wearer. For example, the myopia control function may focus rays of light in front and/or behind the retina of the wearer.

The myopia control function may be configured so as to create a caustic in front of the retina of the eye of the person. In other words, the myopia control function is configured so that, when a person wears the myopia control lens element in specific wearing conditions, for example in standard viewing condition, every section plane where the light flux is concentrated if any, is located in front or behind of the retina of the eye of the person.

The myopia control function may be an optical function, for example a non-spherical function, creating a diffuse volume of light in front and/or behind the retina of the wearer.

Alternatively, the myopia control function may be a scattering function for which incident light is scattered into various directions and creates a blurred image on the retina of the wearer.

Alternatively, the myopia control function may be a diffractive function that redirects and focuses light other than on the retina of the wearer.

Figure 2:
FIG. 2 illustrates a schematic profile view of a lens element according to an embodiment of the disclosure.

As represented in FIGS. 1 and 2, an example of myopia control optical lens 10 according to the disclosure comprises a refraction area 12 and a plurality of optical elements 14.

The refraction area 12 has at least a first refractive power Px based on the prescription of the eye of the person for which the optical lens is intended to be adapted. The prescription is for example adapted for correcting an abnormal refraction of the eye of the wearer. The refraction area 12 may further comprise at least a second refractive power Py different from the first refractive power Px. The refraction area may have a continuous variation of refractive power. For example, the refractive area may have a progressive addition design.

The refraction area 12 is preferably formed as the area other than the areas formed of the plurality of optical elements 14. In other words, the refraction area 12 is the complementary area to the areas formed of the plurality of optical elements 14.

In the embodiment of the disclosure illustrated in FIGS. 1 and 2, the plurality of optical elements 14 contribute to the myopia control function. In other words, the plurality of optical elements 14 have an optical function which combined with the refractive area provide a perturbated image, for example an image of reduced quality, on the retina of the wearer. For example, the optical elements have a function of not focusing an image on the retina of the eye of the wearer when the wearer wears the myopia control optical lens. For example, in standard wearing conditions, rays of light passing through the plurality of optical elements will be deviated differently compared to the rays of light passing through the refraction area. For example, the perturbated image is generated by not focusing light rays on the retina of the eye of the wearer.

The shape and/or dimension and/or organization of the plurality of optical elements 14 may induce diffractive effects that participate and/or modulate the myopia control function.

Advantageously, providing a perturbated image on the retina of the wearer, for example by not focusing an image on the retina of the wearer allows creating a control signal that suppresses, reduces, or at least slows down the progression of abnormal refractions, such as myopia or hyperopia, of the eye of the person wearing the lens element.

The optical elements 14 may be refractive elements such as microlenses having a spherical surface and focusing light rays in front and/or behind the retina. Alternatively, the optical elements may have a non-spherical surface, for example a multifocal shape or an aspherical surface, creating a volume of non-focused light in front and/or behind the retina of the wearer.

Alternatively, the optical elements 14 may be diffractive elements that redirect and focus light rays in front and/or behind the retina of the wearer.

Alternatively, the optical elements 14 may be scattering elements creating scattered volumes of light in front and/or behind the retina of the wearer.

Although the myopia control function has been illustrated with a myopia control optical lens comprising optical elements, the present disclosure is not limited to it.

Figure 3:
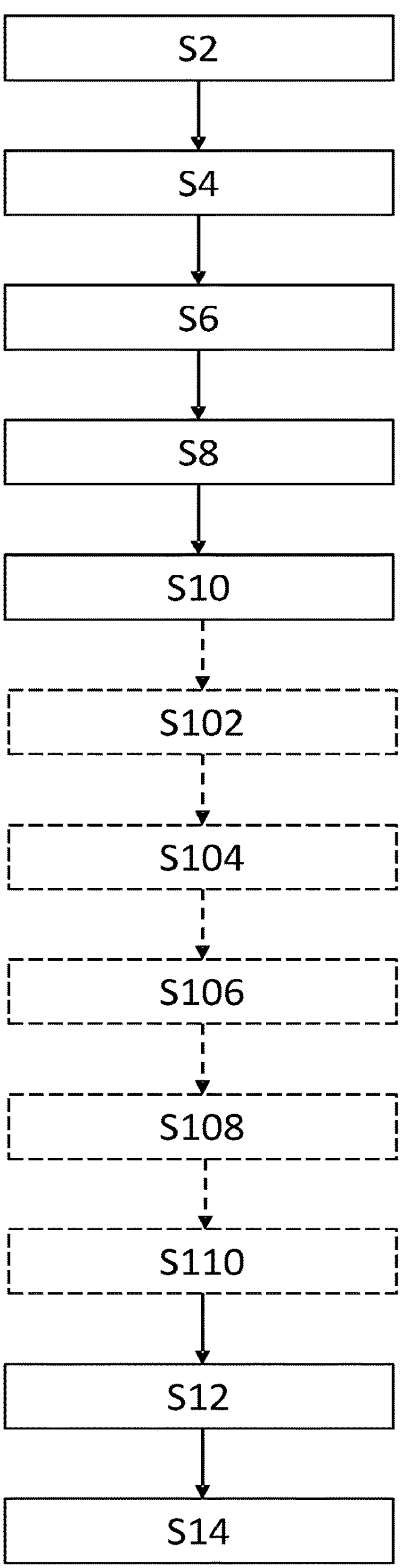
FIG. 3 illustrates a chart-flow of the method for determining the adaptation of a myopia control optical lens to a wearer according to an embodiment of the disclosure.

As represented in FIG. 3, the method for determining the adaptation of a myopia control optical lens to a wearer comprises a step S2 of providing an eye model corresponding to an eye of the wearer.

The eye model corresponds to a set of data defining at least certain specifications regarding the geometry and optical properties of the optical elements of the eye. In other words, the eye model corresponds to an optical system having similar properties of the eye.

The eye model comprises at least geometrical data relative to at least one structure defining the eye model, a center of rotation of the eye model (ERC), and at least one visual axis passing through said eye model rotation center (ERC). In the sense of the disclosure, the visual axis corresponds to the axis passing through the center of rotation of the eye and the center of the pupil of the eye model.

Advantageously, the eye model according to the disclosure accurately simulates the optical properties of an eye, including central and off-axis aberrations, thereby improving the accuracy of the evaluation method.

The eye model may comprise data relating to the cornea of the eye. The anterior corneal surface of the eye model may be defined by at least the shape or topography of the corneal front surface of the eye model. Similarly, the posterior corneal surface of the eye model may be defined by at least the shape or topography of the corneal back surface of the eye model. The shape or topography of the front and back corneal surface allows defining a refraction and/or asphericity of the cornea. The cornea of the eye model may further be defined by a refractive index and/or a distance or thickness between the front and back corneal surfaces.

The eye model may comprise data relating to the anterior chamber, the posterior chamber, and the aqueous humor of the eye. The aqueous humor may be defined by a refractive index and/or a distance or thickness between the corneal back surface and the front surface of the pupil.

The eye model may comprise data relating to the pupil of the eye. The pupil of the eye model may be defined by a stop placed in a vertical plane passing through the anterior vertex of the crystalline lens.

The eye model may comprise data relating to the crystalline lens of the eye. The anterior surface of the crystalline lens of the eye model may be defined by at least the shape or topography of the anterior surface of the crystalline lens of the eye model. Similarly, the posterior surface of the crystalline lens of the eye model may be defined by at least the shape or topography of the back surface of the crystalline lens of the eye model. The shape or topography of the anterior and posterior crystalline lens surfaces allow defining a refraction and/or asphericity of the crystalline lens. The crystalline lens of the eye model may further be defined by a uniform or gradient refractive index and/or a distance or thickness between the front and back crystalline lens surfaces.

The eye model may comprise data relating to the vitreous chamber comprising the vitreous humor of the eye. The vitreous humor may be defined by a refractive index and/or a distance or thickness between the crystalline lens posterior surface and the retina of the eye model.

The eye model may comprise data relating to the retina of the eye. The retina of the eye model may be defined by at least the shape or topography of the retinal surface. The retina of the eye model may further be defined by a decentration in the horizontal direction and/or in the vertical direction.

In the sense of the disclosure, the refractive index of each structure of the eye model may be constant. Alternatively, the distribution of refractive index may be variable along the structure of the eye model. Furthermore, the refractive indices may include dispersion coefficients accounting for the chromatic aberrations.

The surfaces of each element defining the eye model may further be defined by a tilt angle about a vertical axis y and/or a tilt angle about a horizontal axis x. Finally, the surface of each element defining the eye model may further be defined by a decentration with the line of sight of the eye model.

The eye model further includes an eye model rotation center (ERC). The position of the eye rotation center can be measured precisely on the wearer using known methods and apparatus.

The eye model further includes at least an optical axis passing through the eye model rotation center. For example, the optical axis may pass through the center of rotation and the center of the pupil of the eye model.

The eye model may account for the accommodation process of the eye by accurately varying geometry and/or refractive indices of the different structures of the eye model with object proximity. The eye model may reproduce the variation of optical aberrations with accommodation. An example of integrating an accommodative response function in an eye model can be found in the literature, for instance "Adaptive model of the aging emmetropic eye and its changes with accommodation", Rafael Navarro; Journal of Vision 2014; 14(13):21. doi: https://doi.org/10.1167/14.13.21.

The eye model can be an average eye model representative of a general human being, or a segmented eye model representative of a given population. For example, the population may be defined based on a profile of the wearer, for example based on its age, and/or a prescription adapted for the wearer, and/or on central and/or peripheral wavefront aberrations, and/or central and/or peripheral refraction and astigmatism, and/or keratometry, and/or axial lengths, and/or retinal shape measurements. Eye models based on population averages of eye data measurements commonly used for simulations are described in detail in "*Off-axis aberrations of a wide-angle schematic eye model*, Navarro 1999" and "*Optical models for human myopic eyes*, Atchison 2006".

Alternatively, the eye model may be an individual eye model representative of a unique person, based on the person profile and/or based on measurements performed on said person.

Advantageously, using an eye model developed for a specific person or as close as possible to a target population allows improving the accuracy of the method according to the disclosure.

Mathematical optimization algorithms may be used to modify a general eye model to fit as best as possible data measured on the wearer. Advantageously, it allows having a more accurate model while requiring less resources.

As represented in FIG. 3, the method for determining the adaptation of a myopia control optical lens to a wearer comprises a step S4 of providing an environment.

The visual environment may be defined by at least an object, preferably a set of objects, defined in a 3-Dimensional reference frame. The visual environment comprises at least a source object point (M) and at least one source object point (S). The objects of the visual environment may be single point objects, a set of point objects, or grating objects. Additionally, the visual environment may be defined in a reference frame as a discrete set of 3D object points, oriented in a 3-Dimensional space, for example over at least a 20° degrees visual field, and at different distances of a reference point, for example at different distances from the eye model rotation center (ERC).

The luminous conditions of the environment may be defined by associating an emission profile to each object of the visual environment, for example a spectral radiance function.

The visual environment may be associated with a visual ergorama. In the sense of the disclosure, an "ergorama" is a function associating to each gaze direction a distance of an object point.

Usual ergorama may be defined so that in far vision following the primary central vision gaze direction, the object point is at infinity. In near vision, following a downward gaze direction corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 which describes an ergorama, its definition and its modeling method may be considered.

As represented in FIG. 3, the method for determining the adaptation of a myopia control optical lens to a wearer comprises a step S6 of providing a myopia control optical lens model.

The myopia control optical lens model is defined by at least a set of surfaces, a set of thicknesses, and a set of indices of refraction.

As illustrated in FIGS. 1 and 2, the myopia control optical lens model 10 may define at least a first object side surface μl formed as a convex curved surface toward an object side and a second eye side surface F2 formed as a concave surface toward the eye side and having a different curvature than the curvature of the object side surface.

The curvatures of the surfaces F1 and F2 are defined to provide at least a first refractive optical function, for example of focusing light on a single point. For example, the curvatures of the surfaces F1 and F2 may be defined so that the optical function of the myopia control optical lens model corresponds to the prescription of the wearer.

As illustrated in FIGS. 1 and 2, the myopia control optical lens 10 modeled may define a plurality of optical elements 14. The plurality of optical control elements may be modeled to be disposed on the object side surface F1 and/or on the eye side surface F2 of the myopia control optical lens and/or in between the object side surface F1 and the eye side surface F2.

The optical elements modeled may be defined by at least a surface having a different curvature from the object side surface F1 curvature and/or the eye side surface F2 curvature. The optical elements provide a second optical function different from the first refractive function.

The myopia control lens model may further be defined by a coating element disposed on at least part of a surface of the myopia control lens model and at least part of the optical elements. The coating element may also be defined by a refractive index and a thickness.

As represented in FIG. 3, the method for determining the adaptation of a myopia control optical lens to a wearer comprises a step S8 of providing a reference frame.

The reference frame is defined as a 3-Dimensional reference space defined by a set of coordinates axis x, y, z.

Figure 5:
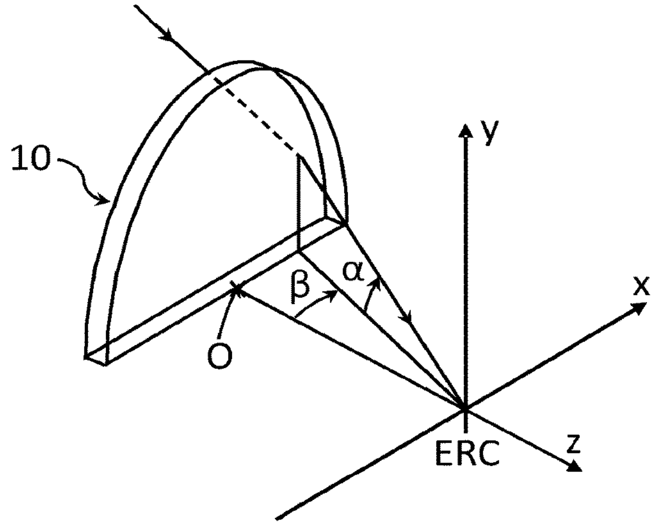
FIG. 5 illustrates a representation of the reference frame according to an embodiment of the disclosure.

As illustrated in FIG. 5, the reference frame may be centered on the eye model rotation center (ERC). For example, the z-axis may coincide with the primary central vision gaze direction. The primary central vision gaze direction is defined by the orientation of the eye model looking straight ahead in the horizontal direction. The x-axis corresponds to the horizontal axis orthogonal to the primary central vision gaze direction and the y-axis corresponds to the vertical axis orthogonal to the z-axis and the y-axis.

As mentioned previously, the visual environment may be associated with the reference frame. A set of coordinates (x, y, z) is assigned to each object point defining the visual environment. The eye model may be associated with the reference frame by assigning to each structure defining it, a set of coordinates (x', y', z'). The myopia control optical lens model may be associated with the reference frame by assigning to each point defining it a set of coordinates (x", y", z").

The position of the myopia control optical lens model within the reference frame is defined relative to the visual environment and the eye model to provide specific optical functions. In particular, the myopia control optical lens model is positioned so that it provides simultaneously a first optical function correcting a vision defect of the eye and producing an image on the foveal part on the retina of the eye model, for example a refractive optical function focusing light on the retina of the eye model, and a second myopia control function to reduce, delay or prevent myopia progression of the wearer, for example perturbating light on the retina of the eye model. For example, the first refractive optical function focuses light rays from objects of the visual environment perceived by the central or foveal part of the retina of the eye model and the second optical function does not focus light rays from objects in the visual environment on the central and peripheral part of the retina of the eye model. In other words, when the wearer fixes an object point, the image formed by this point may have a reduced quality.

In a particular embodiment, the myopia control optical lens model is defined in the reference frame at a specific position corresponding to the wearing conditions of the myopia control optical lens, for example standard wearing conditions, or specific wearing conditions measured on the wearer and adapted for him or her. In the sense of the disclosure, the wearing conditions are to be understood as the position of the lens element with relation to the eye of a wearer in the primary central gaze direction, for example defined by a pantoscopic angle, a wrap angle, a Cornea to lens distance, a center of rotation of the eye (ERC) to Cornea distance, a center of rotation of the eye (ERC) to lens distance.

The Cornea to lens distance is the distance along the visual axis of the eye in the primary position (usually taken to be the horizontal) between the cornmeal anterior surface and the back surface of the optical lens, for example equal to 12 mm.

The center of rotation of the eye (ERC) to cornea distance is the distance along the visual axis of the eye between its center of rotation (ERC) and the anterior corneal surface, for example equal to 13.5 mm.

The center of rotation of the eye (ERC) to lens distance is the distance along the visual axis of the eye in the primary position (usually taken to be the horizontal) between the center of rotation of the eye (ERC) and the back surface of the optical lens, for example equal to 25.5 mm.

The pantoscopic angle is the angle in the vertical plane, at the intersection between the back surface of the optical lens and the visual axis of the eye in the primary position (usually taken to be the horizontal), between the normal to the back surface of the optical lens and the visual axis of the eye in the primary position, for example equal to −8°.

The wrap angle is the angle in the horizontal plane, at the intersection between the back surface of the optical lens and the visual axis of the eye in the primary position (usually taken to be the horizontal), between the normal to the back surface of the optical lens and the visual axis of the eye in the primary position, for example equal to 0.

An example of standard wearing condition may be defined by a pantoscopic angle of −8°, a Cornea to lens distance of 12 mm, an ERC to cornea distance of 13.5 mm, an ERC to lens distance of 25.5 mm and a wrap angle of 0°.

Another example of standard wearing condition more adapted for younger wearers may be defined by a pantoscopic angle of 0°, a Cornea to lens distance of 12 mm, an ERC to cornea distance of 13.5 mm, an ERC to lens distance of 25.5 mm and a wrap angle of 0°.

As represented in FIG. 3, the method for determining the adaptation of a myopia control optical lens to a wearer comprises a step S10 of determining at least one central vision quality criteria.

The central vision quality criteria evaluates the quality of an image in the foveal or central part of the retina of an object point (M) or element of the visual environment seen by the eye model through the myopia control optical lens model.

Central vision quality criteria may be determined for multiple objects positioned at different distances from the myopia control optical lens model and/or from the eye model rotation center (ERC) in the reference frame and/or for different central vision gaze angles. In particular, the central vision quality criteria may be determined for objects located at infinity for central vision gaze.

The central vision quality criteria evaluates the quality of an image formed by the combined effect of the refractive area and the optical elements of interest for an object in central vision. The optical elements of interest are defined by their position on the myopia control optical lens model relative to the rays of light path from the object and to the pupil of the eye model.

Central vision quality criteria and methods to define them are well known and well defined in the customary means in the art.

The central vision quality criteria may be based on the Strehl ratio which corresponds to the ratio between the peak value of the actual point spread function (PSF) divided by the peak value of the diffraction-limited point spread function (PSF) for the same pupil size. The central vision quality criteria may also be based on the visual Strehl ratio VSX. VSOTF and VSMTF of the optical system composed of the eye model and the myopia control optical lens.

The central vision quality criteria may be based on the modulation transfer function (MTF) which evaluates how the contrast of certain frequencies is reduced through the optical system. For example, the area under the modulation transfer function curve between two specific limiting frequencies is measured and compared to the area under the diffraction-limited modulation transfer function curve for the same pupil size.

The central vision quality criteria may be based on the power error. The focal planes of an object point of the visual environment passing through myopia control optical lens may be distant from the retinal surface of the eye model. These distances may be converted into power errors expressed in diopters.

The central vision quality criteria may be based on the astigmatism error. The tangential and sagittal focal planes of an object point of the visual environment passing through the myopia control optical lens may be distant. The distance between these two focal planes may be converted into an astigmatism error expressed in diopter.

The central vision quality criteria may be based on the fraction of encircled energy radius. The encircled energy refers to the concentration of energy on the fovea or central part of the retina evaluated from the image at the retina of an object point of the visual environment passing through the myopia control optical lens model and the eye model. The radius of the point spread function (PSF) containing a predefined amount of energy, for example 50% or 80% is measured. The lower the measured radius is, the higher the quality of the image is.

The central vision quality criteria may be based on the spot diagram radius which is defined as the root mean square (RMS) distance of the rays' intersections from the intersection of a chief ray. The spot diagram radius may be obtained by tracing rays from an object point of the visual environment that cover the pupil, and by computing their intersections with the retina of the eye model.

The central vision quality criteria may be based on the point spread function (PSF) by evaluating the degree of spreading or blurring of an object point, for example located at infinity in the visual environment, formed on the retina of the eye model through the myopia control optical lens model.

The central vision quality criteria may be based on the optical transfer function (OTF) defining how different spatial frequencies are processed by the myopia control optical lens model.

As illustrated in FIG. 3, the step S10 of determining the central vision quality criteria may further comprise a step S102 of determining at least one central gaze direction (αM; βM) associated with the source object point (M).

The central gaze direction represents the direction taken by the eye to bring the line of sight onto the source object point (M), when looking through the myopia control optical lens. The central gaze direction can be determined through ray-tracing, by finding the optical ray originating at (M) and passing through the ERC after refraction through the myopia control optical lens and part of the eye model before the ERC. Alternatively, the central gaze direction can be determined by computing the PSF generated by an object point (M) on the retina, and adjusting the eye gaze direction such that the center of the PSF coincides with the center of the fovea. The central gaze direction (αM; βM) may be defined from the primary gaze reference frame, for example from the primary central vision gaze direction corresponding to the orientation of the eye model looking straight ahead in the horizontal direction.

The object point (M) is considered as a point source and rays emitted from it are propagated through the myopia control optical lens model and the eye model. Physical optics propagation is modeled to take into account both the diffractive and geometric effects induced by the pupil of the eye model as well as the optical elements of the myopia control optical lens.

As illustrated in FIG. 3, the step S10 of determining the central vision quality criteria may further comprise a step S104 of rotating the eye model.

The eye model is rotated within the primary gaze reference frame around the center of rotation of the eye model (ERC) so that the optical axis of the eye model coincides with the central gaze direction (αM; βM). The angles $\beta_H$ and $\alpha_M$ represent respectively the horizontal and vertical rotation angles applied at the CRE in a Fick system to move the eye model from the primary gaze reference frame to the eye gaze reference frame. A third torsional rotation of the eye derived from these two angles is applied so that the eye gaze axes respect Listing law.

As illustrated in FIG. 3, the step S10 of determining the central vision quality criteria may further comprise a step S106 of modifying at least one parameter of the eye model.

The at least one parameter of the eye model modified maybe a geometrical parameter related to the surface of a structure of the eye model, and/or the distance between two structures of the eye model, and/or the refractive index of a structure of the eye model. For example, the curvature of the front and back surfaces of the crystalline lens of the eye model may be modified. Additionally, the size of aperture of the pupil of the eye model may be modified.

The eye model may be modified to account for the accommodation process of an eye with object proximity.

An accommodative response of an eye model may be measured by the difference in optical power between the eye model in an accommodated state and the eye model in an unaccommodated state. The eye model is in the unaccommodated state when an object point located at an infinite distance from the eye model (distance greater than Sm) produces a focused image on the retina after passing through the myopia control optical lens and the eye model or produces an image before the retina. The eye model in the accommodated state arises when the image of an object point through the unaccommodated eye model and myopia control optical lens is behind the retina. It usually happens when the object point is at near or intermediate distance, for example within a few meters from the eye model. The eye model in the accommodated state involves a change of its geometry and/or its optical characteristics to produce an accommodative response. The accommodative response value is positive and corresponds to an increase of the eye model optical power in the accommodated state. For instance, for an unaccommodated emmetropic eye model with no myopia control optical lens model, an object point located at infinity will produce a focused image onto the retina. For an object point located at 1 m from the emmetropic eye model, equivalent to a proximity of 1D, an accommodative response of approximately 1D is needed to focus an image back onto the retina. Such response is usually achieved by modifying the geometry of some elements as for example the crystalline lens in the eye model.

The accommodation process of an eye model maybe defined using an accommodative response function. The accommodative response function is specific to an eye model, and depends on the proximity of an object to the eye model, for example the accommodative response function may depend on the distance between the source object point (M) and the center of rotation of the eye model (ERC). The accommodative response function may further be modulated based on the myopia control optical lens model and/or the central vision quality criteria.

Using the accommodative response function, a modified value of at least one parameter of the eye model may be determined to adapt the accommodative state of the eye model to the proximity of the source object point (M) it is facing.

Advantageously, adapting the eye model accommodation state based on the object proximity allows determining more accurate values of central vision quality criteria used to determine the adaptation of the myopia control optical lens model to the wearer.

As illustrated in FIG. 3, the step S10 of determining the central vision quality criteria may further comprise a step S108 of calculating a central vision quality criteria.

The modification at least one parameter of the eye model will affect its geometry and/or its optical function, and thus ray tracing from the source object point (M) up to the retina of the eye model, thereby impacting the central vision quality criteria evaluation.

The central vision quality criteria is calculated based on the relative position of the source object point (M) to the eye model rotation center (ERC) within the reference frame, the myopia control optical lens model, and the modified eye model.

As illustrated in FIG. 3, the step S10 of determining the central vision quality criteria may further comprise a step S110 of optimizing the central vision quality criteria.

The central vision quality criteria may be optimized by repeating the steps S106 of modifying at least a parameter of the eye model and S108 of calculating a central vision quality criteria.

The central vision quality criteria may be considered optimized when its value evaluated for the source object point (M), the myopia control optical lens model, and the modified eye model is maximal. Alternatively, the central vision quality criteria may be considered optimized when its evaluated value is minimal. Alternatively, the central vision quality criteria may be considered optimized when its value reaches a specific predefined threshold.

As represented in FIG. 3, the method for determining the adaptation of a myopia control optical lens to a wearer comprises a step S12 of determining at least one myopia control efficiency criteria.

According to an embodiment of the disclosure, the myopia control efficiency criteria may be evaluated based on the peripheral defocus of the image of an object point of the visual environment seen by the eye model through the myopia control optical lens model.

Advantageously, the level of peripheral defocus which can generate the myopia progression stop signal may be easily evaluated, thereby providing a way to evaluate the efficiency of the myopia control function of a lens.

Figure 4:
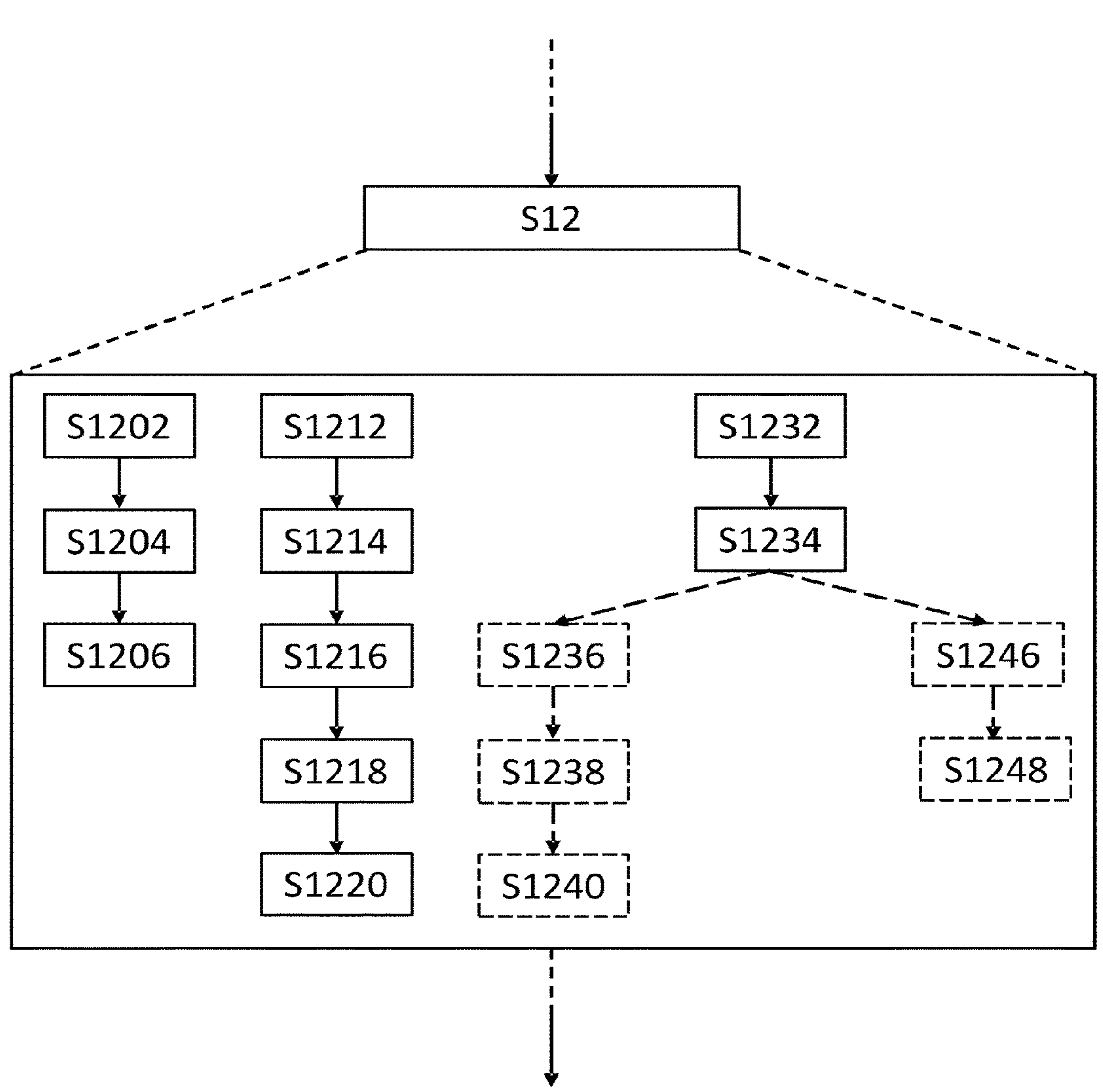
FIG. 4 illustrates a chart-flow of the method for determining a myopia control efficiency criteria.

As represented in FIG. 4, the step S12 of determining at least one myopia control efficiency criteria may comprise a step S1202 of determining at least one peripheral light ray P associated with the at least one object point (S).

Figure 6:
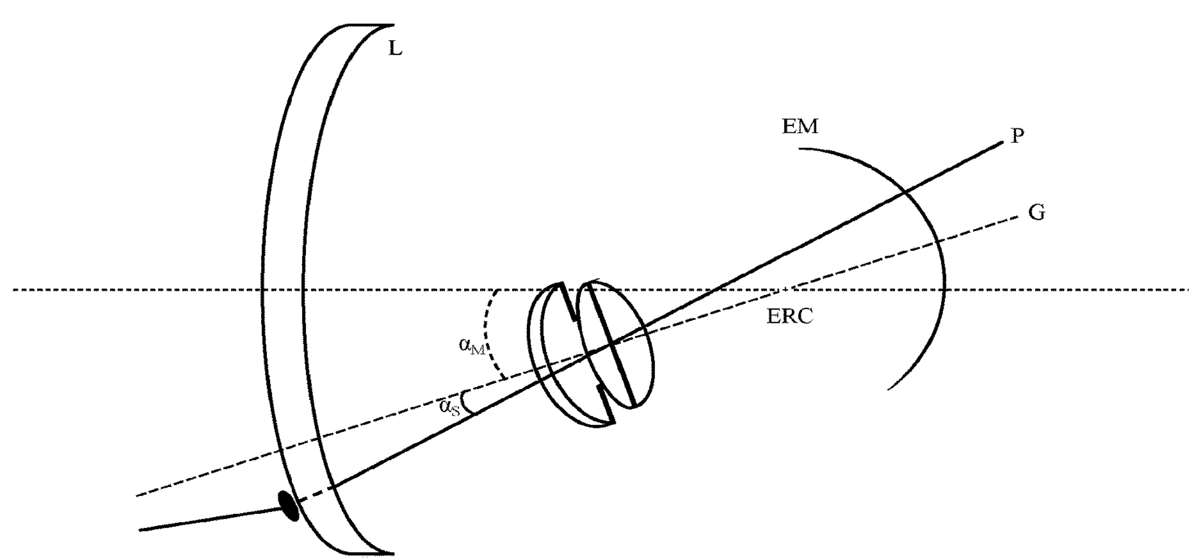
FIG. 6 illustrates a representation of an eye model and myopia control optical lens model according to an embodiment of the disclosure.

As illustrated in FIG. 6, the peripheral light ray P is emitted from the object point (S) of the visual environment, and passes through the myopia control optical lens model and the eye model's pupil, for example through the center of the pupil of the eye model, at a peripheral direction ($\alpha$S; $\beta$S) from the central gaze direction G ($\alpha$M; $\beta$M) of the eye model associated with the source point object (M).

By peripheral light ray, it should be understood that the direction of the light ray P coming from the object (S) to the eye model is significantly different from the central gaze direction of the eye model. In other words, at least one of the absolute values of the angles $|\alpha S|$ and/or $|\beta S|$ is greater than or equal to 1°.

The physical optics propagation of the peripheral light rays P may be modelized considering both the diffractive and geometric effects induced by the structures of the myopia control optical lens model, for example the optical elements, and of the eye model, for example the pupil.

The myopia control efficiency criteria may be calculated for a collection of peripheral light ray directions $P_i$ linked to objects $S_i$ in the visual environment.

The myopia control efficiency criteria may be calculated for a collection of central vision gaze directions $G_k$ related to objects $M_k$ in the visual environment and a collection of peripheral light ray directions $P_i$ linked to objects $S_i$ in the visual environment.

As represented in FIG. 4, the step S12 of determining at least one myopia control efficiency criteria may comprise a step S1204 of evaluating, for example calculating, the location of the astigmatic foci from light passing through the myopia control optical lens model and the eye model. For example, the distance between the astigmatism foci for the peripheral light ray direction P and the intersection of said peripheral light ray with the retina of the eye model is evaluated. The distance between the astigmatic foci and the intersection point with the retina allows evaluating, for example calculating the amount of peripheral defocus, that can generate a myopia progression stop signal.

Alternatively, the distance between the mean focal point for the peripheral light ray direction P, which may be located approximately at mid distance from the astigmatic foci, and the intersection of said peripheral light ray P with the retina may be determined to evaluate the amount of peripheral defocus, that can generate a myopia stop signal.

Preferably, a plurality of light rays emitted from the object S of the visual environment and passing through the pupil of the eye model at different angles may be used to determine the astigmatic focal planes and/or the mean focal plane.

For a collection of object points (Si) of the visual environment and a collection of peripheral light rays Pi with different gaze directions associated with each object, a criteria of myopia-control efficiency can be defined as follows:

$$\sum_k \sum_i w_i^k \left[ (F_{mean}(G_k, S_i, x) - F_{mean}^{target}(\alpha_i, \beta_i))^2 + (DF(G_k, S_i, x) - DF^{target}(\alpha_i, \beta_i))^2 \right]$$

where $F_{mean}$ is the distance between the mean focal point and the intersection point of the peripheral light ray $P_i$ with the retina, and $$F_{mean}^{target}$$

is the associated target distance. DF is the distance between the astigmatism foci, and $DF^{target}$ is the associated target value. Preferably, $$F_{mean}^{target}$$

and $DF^{target}$ only depend on the direction $(\alpha_i, \beta_i)$ of the peripheral light rays Pi and not on the object point proximity.

In the above equation and the following ones, x defines a vector representing the degrees of freedom for the optimization of the myopia control optical lens model. The vector x may relate to parameters such as the geometry of the front surface and/or the geometry of the rear surface of the lens model and/or the refractive index and/or the variation of refractive index of the myopia control optical lens model. If the myopia control lens model comprises optical elements such as refractive micro-structures, the vector x may also relate to the positions of the optical elements and/or the sizes of the optical elements and/or the power of the optical elements and/or the asphericity of optical elements. If the lens model comprises light-scattering elements, the vector x may relate to the positions of the scattering elements and/or the dimensions of the scattering elements and/or the scattering efficiency of the scattering elements; the scattering angle of the scattering elements and/or the BTDF of the scattering elements. If the lens model comprises diffractive micro-structures, the vector x may also relate to the positions of the micro-structures and/or the sizes of the micro-structures and/or the diffraction orders of the micro-structures and/or and diffraction efficiencies of the micro-structures.

As illustrated in FIG. 4, the step S12 of determining at least one myopia control efficiency criteria may comprise a step S1206 of evaluating the peripheral defocus based on the evaluated distances between the astigmatism foci of the peripheral light ray P and the intersection of the peripheral light ray and the retina of the wearer.

According to another embodiment of the disclosure, represented in FIG. 4, the step S12 of determining at least one myopia control efficiency criteria may comprise a step S1212 of determining at least one peripheral light ray P associated with the at least one object point (S).

Step S1212 of determining at least one peripheral light ray P is identical to the previous described step S1202.

As represented in FIG. 4, the step S12 of determining at least one myopia control efficiency criteria may comprise a step S1214 of adding a thin sphero-torical lens model in front of the myopia control optical lens model.

As illustrated in FIG. 6, the thin sphero-torical lens model is positioned in the reference frame near or in close contact with a surface of the myopia control optical lens model. For example, the sphero-torical lens model is positioned near the object side surface of the myopia control optical lens model. The thin sphero-torical lens model is positioned and oriented in the reference frame so that one of its optical axes coincides with the peripheral light ray P when said peripheral light ray propagates in the visual environment.

The thin sphero-torical lens model is defined by at least a set of surfaces, a set of thicknesses, and a set of indices of refraction. In particular, the thin sphero-torical lens model provides at least a first mean spherical optical power and a first astigmatism. The first astigmatism may be equal to 0, in which case the thin sphero-torical lens model would only provide a spherical optical power.

It should be understood that the thin sphero-torical lens model is not part of the lens model but serves as a calculation tool.

A collection of thin sphero-torical lens models may be associated with each of a collection of peripheral light rays emitted from a collection of objects.

As represented in FIG. 4, the step S12 of determining at least one myopia control efficiency criteria may comprise a step S1216 of optimizing a surface of the thin sphero-torical lens model.

At least one parameter defining the surface of the thin sphero-torical lens model that is simulated in the reference frame is modified so that the peripheral light ray P from the object point (S) and passing through said thin sphero-torical lens model focuses onto the retina of the eye model. In other words, parameters defining the thin sphero-torical are changed to have its focal point coincide with the retina of the eye model. For example, at least one parameter defining the thin sphero-torical is modified to have the minimum RMS spot size coinciding with the retina of the eye model.

As represented in FIG. 4, the step S12 of determining at least one myopia control efficiency criteria may comprise a step S1218 of determining the mean optical power of the optimized sphero-torical lens model.

The mean optical power of the thin sphero-torical lens model reflects the value of the peripheral defocus that can generate the myopia progression stop signal. For example, if the mean optical power of the thin sphero-torical lens model is smaller than 0D, the peripheral defocus is myopic, i.e., the mean focal point is formed in front of the retina of the eye model. Similarly, if the mean optical power of the thin sphero-torical lens model is greater than 0D, the peripheral defocus is hyperopic, i.e., the mean focal point is formed behind the retina of the eye model.

As represented in FIG. 4, the step S12 of determining at least one myopia control efficiency criteria may comprise a step S1220 of evaluating a peripheral defocus based on the determined mean optical power of the thin sphero-torical lens model.

According to another embodiment of the disclosure, the myopia control efficiency criteria may be evaluated based on a static image assessment. In other words, the myopia control efficiency criteria may be determined by evaluating the quality of an image, for example in peripheral vision.

As represented in FIG. 4, the step S12 of determining at least one myopia control efficiency criteria may comprise a step S1232 of determining at least one peripheral light ray P associated with the at least one object point (S).

Step S1232 of determining at least one peripheral light ray P is identical to the previous described steps S1202 and S1212.

As represented in FIG. 4, the step S12 of determining at least one myopia control efficiency criteria may comprise a step S1234 of determining a metric Q assessing the image quality viewed through the myopia control optical lens model of the object S on the retina of the eye model.

The metric Q assessing the image quality at the retina level can be correlated with the efficiency of the myopia control function.

Similarly to the central vision quality criteria, the metric Q assessing the retinal image quality for peripheral vision may be based on the Strehl ratio, and/or the modulation transfer function (MFT), and/or the power error, and/or the astigmatism error, and/or the fraction of encircled energy radius, and/or the spot diagram radius, and/or the point spread function (PSF), and/or the optical transfer function (OTF), and/or the visual Strehl ratio (VSX, VSOTF, VSMTF), and/or wavefront aberrations.

For example, the myopia control efficiency criteria may be determined by integrating the modulation transfer function (MTF) of an image of an object point (S) at specific spatial frequencies.

For a specific spatial frequency or a range of spatial frequencies [$f_{min}$, $f_{max}$], and for a collection of central gaze directions $G_k$ and a collection of peripheral light rays $P_i$ from a set of objects $S_i$, the myopia control efficiency criteria based on the modulation transfer function may be defined as follow:

$$\sum_k \sum_i w_i^k \int_{fmin}^{fmax} MTF(f, G_k, S_i, x)df;$$

with $$w_i^k$$

the weighting coefficients for each pair of central gaze direction $G_k$/peripheral object point $S_i$.

When the integral of the modulation transfer function is small over the specific range of spatial frequencies, the efficiency of the myopia control may be high.

According to an embodiment of the disclosure, the myopia control efficiency criteria may be evaluated based on the dynamic image assessment. In other words, the myopia control efficiency criteria may be evaluated by varying parameters of the eye model instead of parameters of the myopia control optical lens model.

As represented in FIG. 4, the step S12 of determining at least one myopia control efficiency criteria may further comprise a step S1236 of modifying at least one parameter of the eye model.

The at least one parameter of the modified eye model may relate to at least one geometrical and/or optical parameter defining the structures of the eye model.

The disclosure will further be described using the axial length of the eye model as the at least one parameter of the eye model modified. However, it would be clear for a person of ordinary skill in the art to adapt the method with another parameter of the eye model described above, for example an accommodation level of the eye model.

The axial length of the eye model simulated is either increased or decreased. Modifying the axial length of the eye model will modify the intrinsic optical properties of the eye model, such as for example, the surface of the retina of the eye model.

By determining if the quality of the image of the object point (S) improves or degrades. i.e., if the metric Q assessing the image quality increases or decreases, when the eye model axial length increases or decreases, it is possible to evaluate the effect of the visual signal on the myopia progression of the wearer.

As represented in FIG. 4, the step S12 of determining at least one myopia control efficiency criteria may comprise a step S1238 of repeating the steps S1234 of determining the metric Q assessing the retinal image quality and the steps S1236 of modifying at least one parameter of the eye model.

For each value of the at least one parameter of the eye model, for example the axial length of the eye model, a value of the image quality Q is associated to it. Based on this repetition, it is possible to calculate the value of the at least one parameter of the eye model, for example the axial length of the eye model, for which the image quality is optimal, i.e., the parameter of the eye model for which the metric Q assessing the image quality is optimal, for example minimal or maximal.

As represented in FIG. 4, the step S12 of determining at least one myopia control efficiency criteria may comprise a step S1240 of determining the at least one parameter of the eye model for which the metric Q is optimal.

Continuing the example for which the at least one parameter of the eye model is its axial length, an axial length of the eye model for which the metric Q is optimal, higher than the initial axial length of the eye model may imply a visual signal tending to increase the myopia of the person. When the axial length for which the metric Q is optimal is lower than the initial axial length, the visual signal may imply a stop signal for the myopia progression. In addition, if the axial length for which the metric Q is optimal is lower in the case of the myopia control optical lens than it is with a standard single vision lens, the myopia control optical lens model may be more efficient than the standard single vision lens to reduce the progression of myopia.

For a collection of couples of central gaze directions Gk and peripheral light rays Pi from a set of objects Si, the formulation of the myopia control efficiency criteria based on the axial length value for which the metric Q is optimal may be defined as follows:

$$\text{argmax\_l} \sum_k \sum_i w_i^k Q(l, G_k, S_i, x)$$

Advantageously, the axial length of the eye model for which the image quality Q is optimal, can be related to the myopia control efficiency of the myopia control optical lens model.

As represented in FIG. 4, the step S12 of determining at least one myopia control efficiency criteria may comprise a step S1246 of evaluating the variation of the metric Q as a function of the at least one parameter of the eye model, for example the axial length l of the eye model.

For a given couple of a central gaze direction G (αM; βM) from a source object point (M) and peripheral light ray P (αS; βS) from an object point (S), an elongation signal representing the evolution of the metric Q assessing the image quality as a function of the axial length l of the eye model may be defined as follows:

$$\frac{\partial Q(l, G, S, x)}{\partial l}$$

For a collection of couples of central gaze directions $G_k$ associated with a collection of source object points ($M_k$) and peripheral light rays $P_i$ from a set of object points ($S_i$), the myopia control efficiency criteria based on the slope of the metric Q as a function of the axial length l may be defined as follows:

$$\sum_k \sum_i w_i^k \frac{\partial Q(l, G_k, S_i, x)}{\partial l};$$

with $$w_i^k$$

the weighting coefficients for each pair of central gaze direction $G_k$/peripheral light ray from object point $S_i$.

As represented in FIG. 4, the step S12 of determining at least one myopia control efficiency criteria may further comprise a step S1248 of determining the slope of the function of the metric Q by the at least one parameter of the eye model, for example the axial length of the eye model.

Advantageously, the slope of the function of the image quality metric Q by the axial length can be related to the myopia control efficiency of the myopia control optical lens model.

The embodiment of the disclosure has been described using the axial length of the eye model for the at least one parameter of the eye model. However, it would appear obvious to a person of ordinary skill in the art how to adapt the disclosure and especially the equations for other parameters defining the eye model.

As represented in FIG. 3, the method for determining the adaptation of a myopia control optical lens to a wearer comprises a step S14 of determining the adaptation of the myopia control optical lens to the wearer.

In the sense of the disclosure, the adaptation of the myopia control optical lens refers to a set of parameters defining said myopia control optical lens to best fit the wearer. In other words, the determination of the adaptation of a myopia control optical lens to a wearer corresponds to the determination of the value of parameters of the myopia control optical lens adapted for the wearer.

When the myopia control optical lens is a single vision or a progressive addition lens made of continuous and continuously differentiable front and back surfaces, determining the adaptation may consist in determining the geometry of one or both of the front and back surfaces of the lens to be optimized.

When the myopia control optical lens is a bifocal or a multifocal lens where at least one surface consists of multiple continuous and continuously differentiable zones adjacent to each other and separated by a discontinuity in height or slope, determining the adaptation may consist in determining the geometry of each zone, and the domain of each zone.

When the myopia control optical lens comprises optical elements, determining the adaptation may consist in determining at least one of the geometry, and/or the size, and/or the position, and/or the number, and/or the density, and/or the repartition of the optical elements on the optical lens.

When the optical elements are refractive microlenses, determining the adaptation may consist in determining the spherical and/or the non-spherical and/or aspherical shape of the optical elements. When the optical elements are scattering elements, determining the adaptation may consist in determining the BTDF of the optical elements. When the optical elements are diffractive elements, determining the adaptation may consist in determining the diffractive phase function of the optical elements.

The adaptation of the myopia control optical lens is determined based on the central vision quality criteria and the myopia control efficiency criteria.

Advantageously, the adaptation of the myopia control lens allows adapting the optical lens to be provided to the wearer so that it provides the best trade-off between the reduction of the progression of myopia and the visual acuity for central vision.

According to an embodiment of the disclosure, the adaptation of the myopia control optical lens may be defined by the optimization, for example a minimization or maximization, of a weighted cost function (F) being the weighted sum of the central vision criteria (CV) and the myopia control criteria (MCE):

$$F = w_1(CV) + w_2(MCE);$$

with $w_1$ and $w_2$ the weight representing the importance attributed to each criteria for the optimization of the adaptation.

According to another embodiment of the disclosure, the adaptation of the myopia control optical lens may be defined based on a multi-objective approach which is a method for optimizing problems with antagonistic objectives. The multi-objective optimization considers a population of elements to optimize and makes them evolve to reach a set of "non-dominated" solutions. These solutions each represent a different optimal compromise, among which a final lens can be chosen.

The method for determining the adaptation of a myopia control optical lens to a wearer may further comprise a step of applying the adaptation to determine a myopia control lens design adapted for the wearer and/or to modify an existing myopia control lens design to best adapt it to the wearer. Alternatively, the myopia control lens design most adapted to the wearer may be selected among a list of predetermined designs.

The method for determining the adaptation of a myopia control optical lens to a wearer may further comprise a step of manufacturing the myopia control lens adapted for the wearer. The myopia control lens is manufactured based on the set of parameters defined during the step of determining the adaptation of the myopia control optical lens to best fit the wearer. In other words, the myopia control optical lens is manufactured based on the determined most adapted central vision quality criteria and myopia control efficiency criteria.

An example of the application of the method for determining an adaptation of a myopia control optical lens according to the disclosure will be further described in detail.

A myopic eye model (EM) with a central refraction of −4.0D and a mean peripheral defocus at 30° in the horizontal meridian of −0.2D, a pupil diameter set to 4.0 mm and left in an unaccommodated state is defined. The lens model (L) used is a single vision lens with an array of microlenses on its front surface. The lens model has a refractive index equal to 1.59 and a front base curve of 2.59D. The microlenses have a spherical front surface and are organized in a hexagonal mesh on the lens model front surface, with a mesh step of 1.51 mm and a microlens radius of 0.5 mm for a microlenses density of 40%.

In this example, the adaptation x of the myopia control optical lens aims to optimize the radius of curvature of all the microlenses. In other words, the adaptation x of the myopia control optical lens aims to optimize the surfacic power addition of all the microlenses with respect to the spherical front surface base curve.

The central vision criteria (VC) is determined based on the visual Strehl ratio in the frequency domain (VSOTF) for an object point source (M) at infinity on the central gaze direction set to $\alpha=0$ and $\beta=0$.

The myopia control efficiency criteria (MCE) is determined based on a dynamic image assessment. The metric Q assessing the image quality for peripheral vision is also determined based on the visual Strehl ratio in the frequency domain (VSOTF) as follow:

$$MCE(EM, L(x)) = \frac{\partial VSOTF(m, S, L(x))}{\partial m};$$

with S an object point at infinity coming from a peripheral angle from the main gaze direction with an angle of 30° in the horizontal meridian, x being the radius of curvature of the microlenses, and m the central equivalent refraction.

The cost function that needs to be maximized to determine the value x of the adaptation of the myopia control optical lens reads as follow:

$$F(EM, L(x)) = Q(EM, L(x)) + 10 * MCE(EM, L(x))$$

Figure 7A:
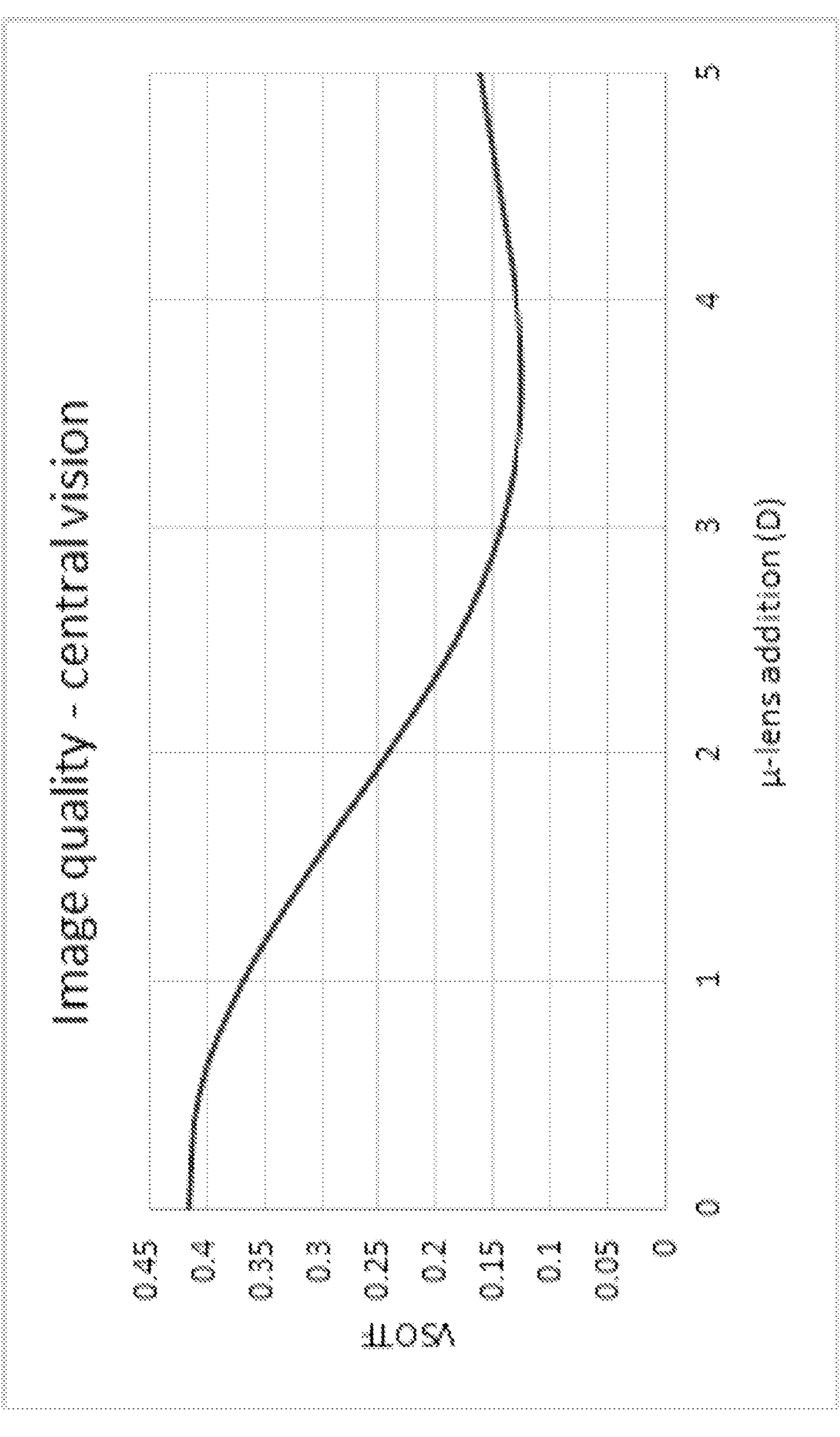
FIGS. 7A, 7B, and 7C illustrate functions used to determine an adaptation of the myopia control optical lens according to an embodiment of the disclosure.
Figure 7B:
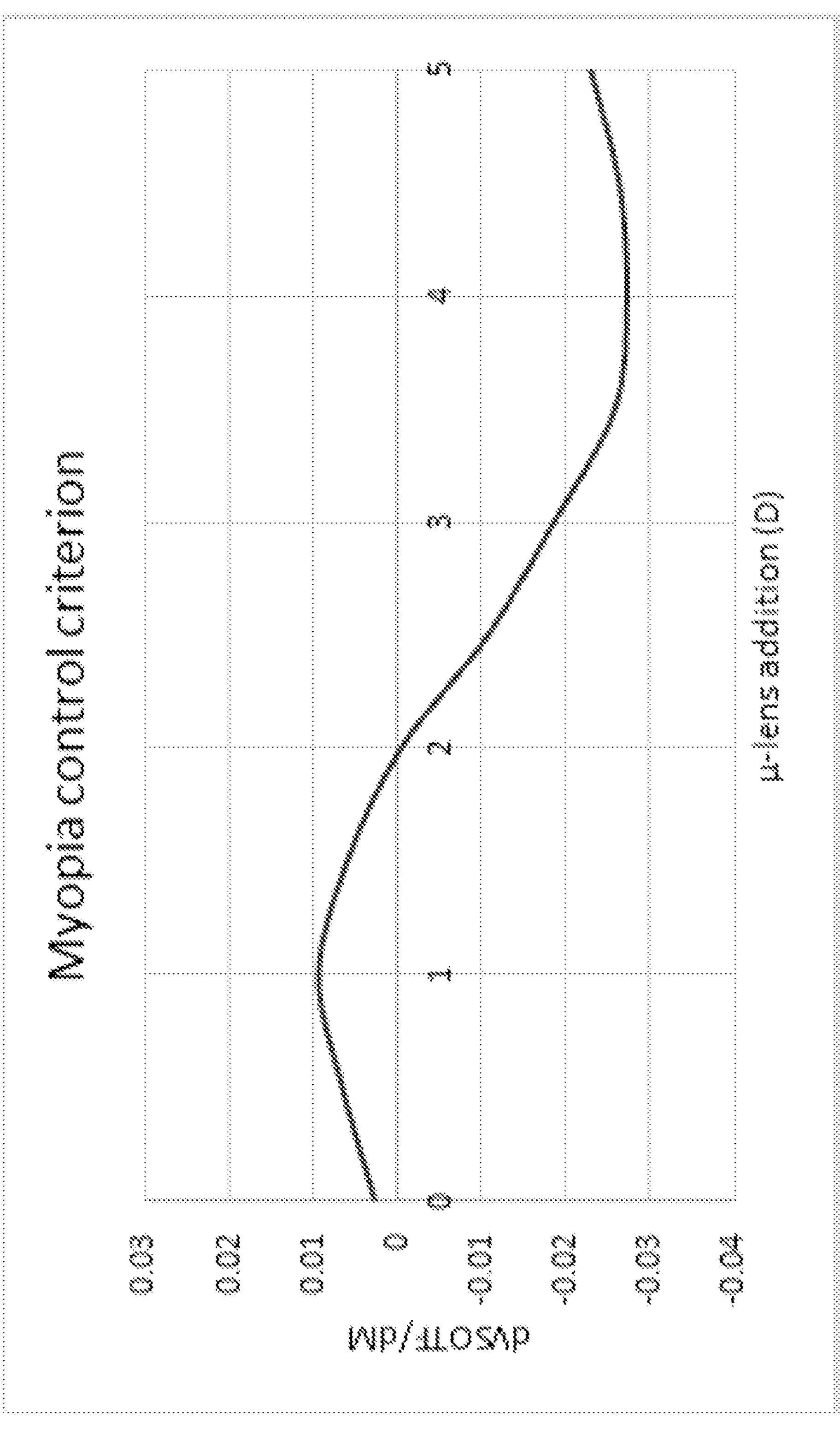
Figure 7C:
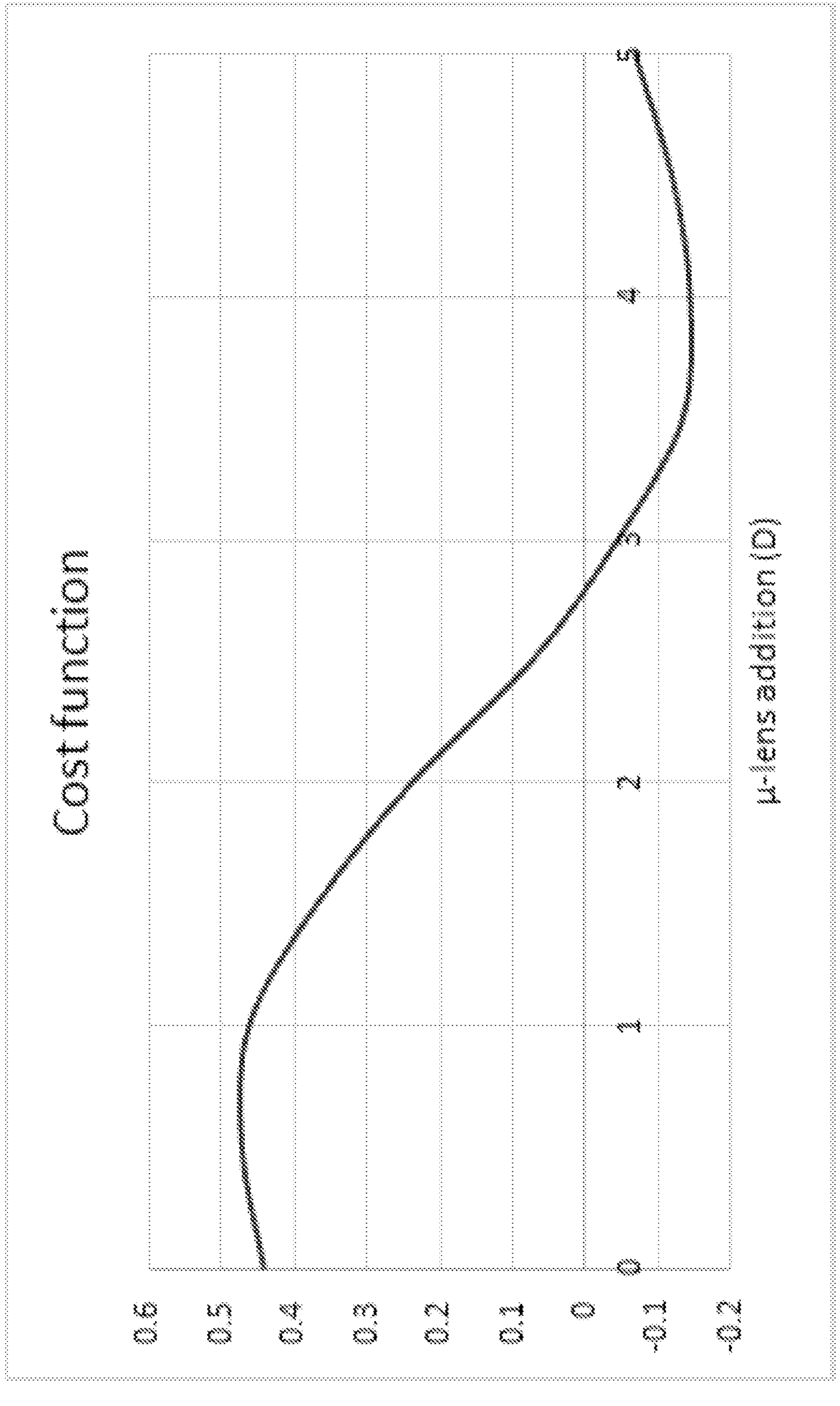

FIGS. 7A and 7B illustrate the variation of the central vision criteria as a function of the microlenses addition and the variation of the myopia control efficiency criteria as a function of the microlenses addition respectively. Based on the cost function curve represented in FIG. 7C, it can be determined that the optimal addition of the microlenses which provides the best balance in visual acuity in central vision and control of the myopia progression, i.e., the adaptation of the myopia control optical lens, is approximately equal to 0.75D.

An alternative to the above mono-objective formulation is to use a multi-objective approach which would seek to maximize both antagonistic objectives (max Q, max MCE).

The above example used to explain the method according to the disclosure has been simplified to not render the text cumbersome. As such, the eye and lens model used are very basic, the number of object points limited, the number of parameters optimized to determine the adaptation limited. Yet, in view of the present disclosure, it would be clear for a skilled person to refine the method and determine a more accurate adaptation.

The disclosure further relates to a method for comparing at least two myopia control optical lenses for a wearer.

The method comprises determining the adaptation of each myopia control optical lens for the wearer based on the method described in the above disclosure and further comparing the adaptation of each myopia control optical lens to determine the adaptation best fit for the wearer.

The disclosure relates to a computer program product comprising one or more stored sequences of instructions that are accessible to a processor and which, when executed by the processor, causes the processor to carry out the steps of a method according to the disclosure.

The disclosure further relates to a computer readable medium carrying one or more sequences of instructions of the computer program product according to the disclosure.

Furthermore, the disclosure relates to a program which makes a computer execute a method of the disclosure.

The disclosure also relates to a computer-readable storage medium having a program recorded thereon; where the program makes the computer execute a method of the disclosure.

The disclosure further relates to a device comprising a processor adapted to store one or more sequence of instructions and to carry out at least one of the steps of a method according to the disclosure.

The disclosure further relates to a non-transitory program storage device, readable by a computer, tangibly embodying a program of instructions executable by the computer to perform a method of the present disclosure.

Unless specifically stated otherwise, as apparent from the following discussions, it is appreciated that throughout the specification discussions utilizing terms such as "computing", "calculating". "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many further modifications and variations will be apparent to those skilled in the art upon referring to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method, implemented by a computer, for determining adaptation of a myopia control optical lens to a wearer, the myopia control optical lens being configured to provide simultaneously to the wearer a refractive optical function based on a prescription for said wearer and a myopia control function to reduce, delay, or prevent myopia progression of the wearer, the method comprising:

obtaining an eye model corresponding to an eye of the wearer, said eye model comprising at least geometrical data relative to at least one structure of the eye model, an eye model rotation center, and at least one eye model optical axis passing through the eye model rotation center;

obtaining a visual environment comprising at least a source object point and at least one object point;

obtaining a myopia control optical lens model;

obtaining a reference frame and positioning the eye model, the myopia control optical lens model, and the visual environment in the reference frame;

determining at least one central vision quality criteria for at least one object point of the visual environment seen by the eye model through the myopia control optical lens model, wherein the determining the central vision quality criteria further comprises:

determining at least one central gaze direction associated with the source object point, rotating the eye model around the eye model rotation center so that the eye model optical axis coincides with the central gaze direction, modifying at least one parameter of the eye model, calculating a central vision quality criteria based on the relative position of the source object point to the eye model rotation center within the reference frame, the myopia control optical lens model, and the modified at least one parameter of eye model, and optimizing the central vision quality criteria by repeating the modifying the at least one parameter of the eye model and the calculating the central vision quality criteria;

determining at least one myopia control efficiency criteria for at least one object point(S) of the visual environment seen by the eye through the myopia control optical lens model; and determining the adaptation of the myopia control optical lens to the wearer based on the at least one central vision quality criteria and the at least one myopia control efficiency criteria.

2. The method according to claim 1, wherein the at least one structure of the eye model relates to an eye's cornea, and/or an eye's crystalline lens, and/or an eye's pupil, and/or an eye's retina surface.

3. The method according to claim 1, wherein the eye model is obtained based on data relative to the wearer.

4. The method according to claim 1, wherein the visual environment is associated with a visual ergorama.

5. The method according to claim 1, wherein the visual environment is associated with a discrete set of points located within a visual field of the eye model greater than or equal to 20° and at different distances from the eye model rotation center (ERC).

6. The method according to claim 1, wherein the at least one central vision quality criteria is based on at least one of:

Strehl ratio, and/or
a Modulation Transfer Function, and/or
power error, and/or
astigmatism error, and/or
fraction of encircled energy radius, and/or
spot diagram radius, and/or
a point spread function, and/or
an optical transfer function, and/or
visual Strehl ratio, and/or
wavefront aberrations.

7. The method according to claim 1, wherein the determining the myopia control efficiency criteria further comprises:

determining, for the central gaze direction of the eye model associated with the source point object, at least one peripheral light ray associated with the at least one object point and passing through the myopia control optical lens model and the eye model's pupil at a direction, evaluating, for the at least one object source point associated to the at least one peripheral light ray, a location of astigmatic foci from light passing through the myopia control optical lens model and the eye model, and evaluating a peripheral defocus based on the evaluated distances between the astigmatic foci for the at least one peripheral light ray and an intersection of the peripheral light ray and the eye model's retina.

8. The method according to claim 1, wherein the determining the myopia control efficiency criteria further comprises:

determining, for the central gaze direction of the eye model associated with the source point object, at least one peripheral light ray associated with the at least one object point and passing through the myopia control optical lens model and the eye model's pupil at a direction, adding a thin sphero-torical lens model in front of the myopia control optical lens model such that an optical axis of said thin sphero-torical lens model coincides with the at least one peripheral light ray when the peripheral light ray propagates in the visual environment, optimizing a surface of the thin sphero-torical lens model so that light of the at least one peripheral light ray focuses on the eye model's retina, determining a mean optical power of the optimized thin sphero-torical lens model, and evaluating a peripheral defocus based on the mean optical power of the thin sphero-torical lens model.

9. The method according to claim 1, wherein the determining the myopia control efficiency criteria further comprises:

determining, for a central gaze direction of the eye model associated with the source point object, at least one peripheral light ray associated with the at least one object point and passing through the myopia control optical lens model and the eye model's pupil at a direction, and determining a metric assessing an image quality of the object point through the myopia control optical lens model and the eye model on the eye model's retina.

10. The method according to claim 9, wherein the determining the myopia control efficiency criteria further comprises:

modifying at least one eye model parameter, repeating the determining the metric and the modifying the at least one eye model parameter, and determining the at least one eye model parameter for which the metric is optimal.

11. The method according to claim 9, wherein the determining the myopia control criteria further comprises:

evaluating the metric as a function of at least one eye model parameter, and determining a slope of the metric expressed as a function of the at least one eye model parameter.

12. The method according to claim 9, wherein the metric assessing the image quality for peripheral vision is based on at least one of:

Strehl ratio, and a Modulation Transfer Function, and/or power error, and/or astigmatism error, and/or fraction of encircled energy radius, and/or spot diagram radius, and/or a point spread function, and/or an optical transfer function, and/or visual Strehl ratio, and/or wavefront aberrations.

13. The method according to claim 7, wherein the at least one myopia control efficiency criteria is evaluated for a set of object points located in the visual environment and according to a set of gaze directions.

14. A method for comparing at least two myopia control optical lenses for a wearer and selecting a most adapted, the method comprising:

determining the adaptation of each myopia control optical lens for the wearer by the method according to claim 1;

comparing the adaptation of each myopia control optical lens to the wearer; and selecting the most adapted myopia control optical lens.

15. The method according to claim 3, wherein the data relative to the wearer relates to at least one of the wearer age and the wearer eye prescription.

* * * * *